United States Patent
Lang et al.

(10) Patent No.: US 11,581,178 B2
(45) Date of Patent: Feb. 14, 2023

(54) ANOMALY DETECTION OF GAS FLOW PARAMETERS IN MASS SPECTROMETRY

(71) Applicant: Roche Diagnostics Operations, Inc., Indianapolis, IN (US)

(72) Inventors: Robert Lang, Munich (DE); Stefan Quint, Munich (DE); Gabriele Punzmann, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 17/453,683

(22) Filed: Nov. 5, 2021

(65) Prior Publication Data
US 2022/0165557 A1 May 26, 2022

(30) Foreign Application Priority Data
Nov. 25, 2020 (EP) .................................... 20209866

(51) Int. Cl.
*H01J 49/00* (2006.01)
*H01J 49/04* (2006.01)
(Continued)

(52) U.S. Cl.
CPC ........ *H01J 49/045* (2013.01); *G01N 30/7266* (2013.01); *H01J 49/025* (2013.01); *H01J 49/167* (2013.01)

(58) Field of Classification Search
CPC ...... H01J 49/045; H01J 49/025; H01J 49/167; H01J 49/10; H01J 49/0027; G01N 30/7266; G01N 30/02; G01N 27/62; G01N 30/72
(Continued)

(56) References Cited

U.S. PATENT DOCUMENTS

| 5,463,219 A | 10/1995 | Buckley et al. |
| 2005/0258360 A1* | 11/2005 | Whitehouse .......... H01J 49/165 250/288 |

FOREIGN PATENT DOCUMENTS

| JP | 2009-031113 A | 2/2009 |
| WO | 2003/065406 A1 | 8/2003 |
(Continued)

OTHER PUBLICATIONS

European Search Report dated Apr. 22, 2021, in Application No. 20209866.1, 2 pp.
(Continued)

*Primary Examiner* — Michael Maskell
(74) *Attorney, Agent, or Firm* — Roche Diagnostics Operations, Inc.

(57) ABSTRACT

A mass spectrometry (MS) apparatus is provided. The MS apparatus includes a mass spectrometer, an ionization source coupled to the mass spectrometer, and a flow injection system (FIS) coupled to the ionization source. The ionization source is configured to provide an ionized gas flow of an analyte towards an entrance of the mass spectrometer. The ionization source is further configured to provide a second gas flow of a second gas. The MS apparatus is configured to measure a mass spectrometer (MS) signal of the analyte. The MS apparatus is further configured to analyze a dependency of the MS signal of the analyte versus a parameter of the second gas flow or a state of the second gas flow and to determine a condition of the apparatus based on the analyzed dependency.

26 Claims, 6 Drawing Sheets

(51) Int. Cl.
 *G01N 30/72* (2006.01)
 *H01J 49/02* (2006.01)
 *H01J 49/16* (2006.01)

(58) Field of Classification Search
 USPC .................................................. 250/281, 282
 See application file for complete search history.

(56) References Cited

FOREIGN PATENT DOCUMENTS

| | | |
|---|---|---|
| WO | 2019/229453 A1 | 12/2019 |
| WO | 2020/225863 A1 | 11/2020 |

OTHER PUBLICATIONS

Thermoscientific, Exactive Series Operating Manual, 2017, retrieved from https://assets.thermofisher.com/TFS-Assets/CMD/manuals/mann-bre0012255-exactive-series-manbre0012255-en, 257 pp.

* cited by examiner

ANOMALY DETECTION OF GAS FLOW PARAMETERS IN MASS SPECTROMETRY

CROSS-REFERENCE TO RELATED APPLICATIONS

This application claims priority to European Patent Application No. 20209866.1, filed 25 Nov. 2020, the disclosure of which is hereby incorporated by reference in its entirety.

TECHNICAL FIELD

The present disclosure is related to a mass spectrometry (MS) apparatus for chemical analysis including a flow injection system (FIS) and an ionization source, where the flow injection system is coupled to the ionization source. The present disclosure is also related to a method for chemical analysis in an MS apparatus.

BACKGROUND

There is growing interest for the implementation of mass spectrometry and more specifically a flow injection system (FIS) (including FIS comprising a liquid chromatography (LC) system) coupled to a mass spectrometer in the clinical laboratory as well as in other laboratory settings. Therefore, the reliable operation of an MS apparatus and prompt detection of possible malfunctions in its operation can be important for accurate and robust MS measurements of the analyzed samples.

However, detecting possible errors in the settings of gas flow parameters in an ionized source of the MS apparatus might be a challenging task. In some examples, special external devices for measuring the gas flow are required for this purpose. In addition, this may involve relatively complex manually performed steps and advanced skills. These requirements will not be met by every operator. Therefore, some existing MS devices fail to timely detect deviations from the correct settings of gas flow parameters caused, e.g., by a possible leakage. As a result, some of these MS based analyzers suffer from undesired signal losses, background increase or MS signal increase (or from other issues). Furthermore, such situations may reduce a sensitivity of the MS apparatus and lower its detection limit (e.g., due to a leakage of a nebulizer or an auxiliary gas flow into the exterior or interior of the MS apparatus). They might also lead to increased contamination of the MS apparatus (for example, due to a leakage of a counter gas flow into the exterior or interior of the MS apparatus, particularly, into a mass spectrometer resulting in its increased aging). Therefore, there is a need in developing new efficient techniques capable of solving the above mentioned problems.

SUMMARY

In accordance with one embodiment of the disclosure, a mass spectrometry (MS) apparatus for chemical analysis is provided, the apparatus comprising: a mass spectrometer; an ionization source coupled to the mass spectrometer; a flow injection system (FIS) coupled to the ionization source, wherein the ionization source is configured to provide an ionized gas flow of an analyte towards an entrance of the mass spectrometer, wherein the ionization source is further configured to provide a second gas flow of a second gas; wherein the apparatus is configured: to measure a mass spectrometer (MS) signal of the analyte; to analyze a dependency of the MS signal of the analyte versus a parameter of the second gas flow or a state of the second gas flow; and to determine a condition of the apparatus based on the analyzed dependency.

In accordance with another embodiment of the disclosure, a method in a mass spectrometry (MS) apparatus for chemical analysis is provided, the method comprising: providing an ionized gas flow of an analyte towards an entrance of a mass spectrometer by an ionization source; providing a second gas flow of a second gas by the ionization source; measuring a mass spectrometer (MS) signal of the analyte by the mass spectrometer; analyzing a dependency of the MS signal of the analyte versus a parameter of the second gas flow or a state of the second gas flow; and determining a condition of the apparatus based on the analyzed dependency.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
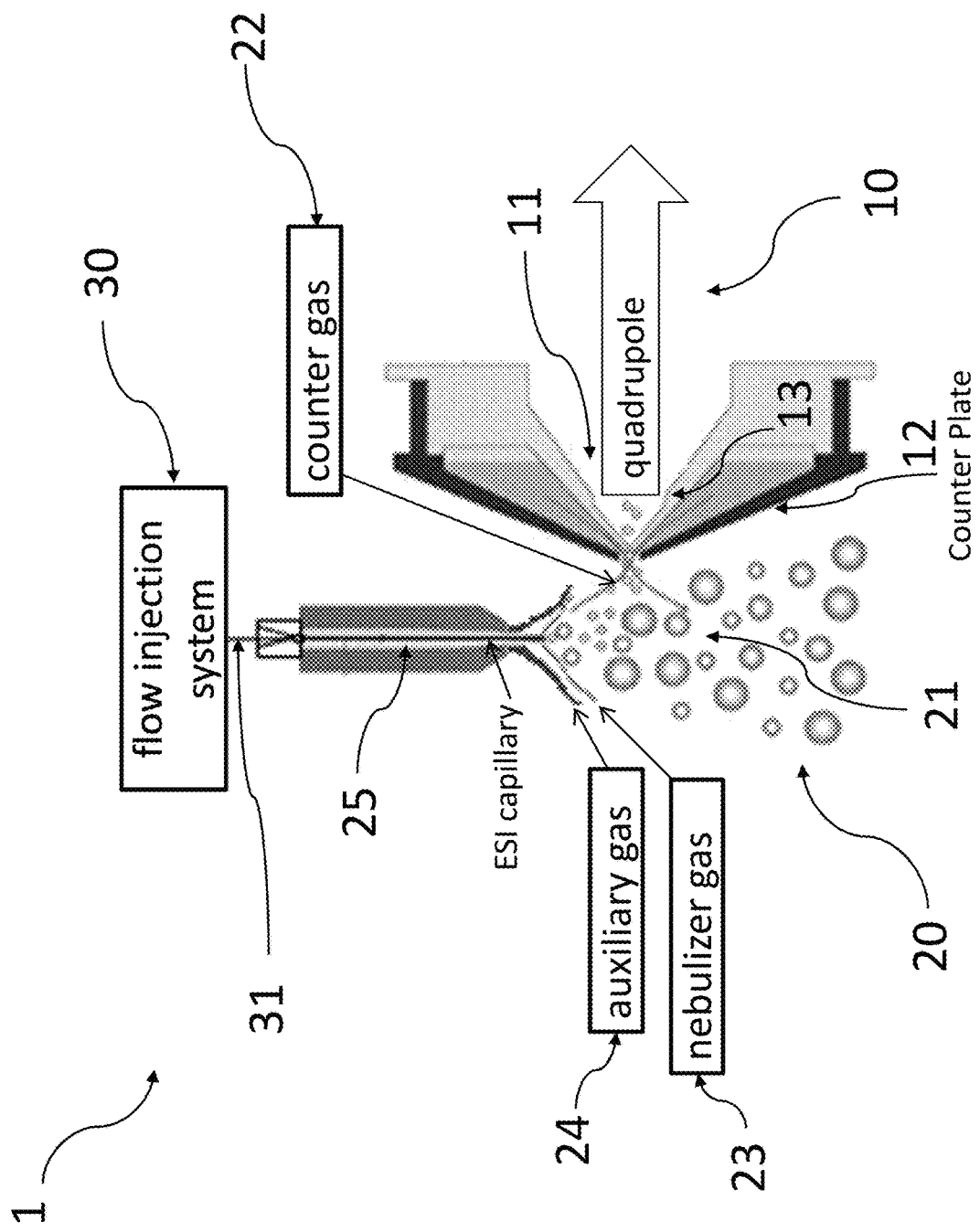
FIG. 1 shows schematically a mass spectrometry (MS) apparatus for chemical analysis with a flow injection system (FIS) coupled to an ionization source, the latter being coupled to a mass spectrometer in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

In one general aspect, the present disclosure relates to a mass spectrometry (MS) apparatus. The MS apparatus includes a mass spectrometer, an ionization source coupled to the mass spectrometer and a flow injection system (FIS) coupled to the ionization source. The ionization source is configured to provide an ionized gas flow of an analyte towards an entrance of the mass spectrometer. The ionization source is further configured to provide a second gas flow of a second gas. The MS apparatus is configured to measure a mass spectrometer (MS) signal of the analyte. The MS apparatus is further configured to analyze a dependency of the MS signal of the analyte versus a parameter of the second gas flow or a state of the second gas flow and to determine a condition of the apparatus based on the analyzed dependency.

In a second general aspect, the present disclosure relates to a method for chemical analysis in the MS apparatus of the first general aspect.

The technique of the first and second general aspects can have advantageous technical effects.

Although the embodiments of the present disclosure are not limited to specific advantages or functionality, it is noted that firstly, the technique of the present disclosure can use an ionized gas flow of an analyte, e.g., comprising molecules with large molecular mass such as cyclosporine A or cesium iodide on one hand, and a second gas flow in the ionization source (such as, e.g., a counter gas flow, a nebulizer gas or an auxiliary gas) on the other hand to gain insight into a condition of the MS apparatus (e.g., whether the MS apparatus operates normally or abnormally with a malfunction) based on the measured and analyzed MS signal of the analyte.

Secondly, using this knowledge, the technique of the present disclosure can also help to promptly trigger a respective response, e.g., informing an operator (who can then address the problem). In other examples, the operation of the MS apparatus can be stopped in case of severe errors. In addition, such a process can be automatized, e.g., on a fully automated MS based analyzer.

Thirdly, the present technique has the additional advantage as it might not involve using external devices for measuring gas flows to detect possible errors in the condition of the MS apparatus. Thus, systems errors can be detected and solved more reliable and efficiently, which may result in decreasing the system down-time as compared to some other MS devices.

Fourthly, the present technique can be implemented as a routine procedure during operation of the MS apparatus.

The term "mass spectrometer (MS)" may refer to an analytical module comprising a mass analyzer designed to further separate and/or detect analytes based on their mass to charge ratio. In some examples, the mass spectrometer is a fast scanning mass spectrometer. However, in other examples the mass spectrometer is a tandem mass spectrometer capable of selecting parent molecular ions, generating fragments by collision-induced fragmentation, and separating the fragments or daughter ions according to their mass to charge (m/z) ratio. In still other examples, the mass spectrometer is a triple quadrupole mass spectrometer, as known in the art. Besides quadrupoles, other types of mass analyzers may be used as well, including time of flight, ion trap or combinations thereof.

The term "ionization source" as used herein refers to an interface coupling a flow injection system to a mass spectrometer (FIS/MS) configured to generate charged analyte molecules (molecular ions) and transferring the charged analyte molecules from a liquid into a gas phase. According to certain embodiments, the ionization source is an electrospray ionization (ESI) source, or a heated electrospray ionization (HESI) source, or an atmospheric pressure chemical ionization (APCI) source, or an atmospheric pressure photo ionization (APPI) or an atmospheric pressure laser ionization (APLI) source. The FIS/MS interface may comprise however a double ionization source, e.g., both an ESI and an APCI source, or a modular exchangeable ionization source. Typical parts of an ionization source may be a nebulizer and a sampling capillary, typically arranged orthogonally or coaxially with respect to each other. A liquid exiting the flow injection system is guided through a probe including a sprayer needle or capillary. In this manner, the liquid is nebulized in a volume downstream of the sprayer capillary where ionization takes place and the charged analyte molecules thereby obtained are brought into a gaseous phase. A sampling device (e.g., a sampling capillary or orifice) is provided to collect the ions in the gaseous phase and guide them into the mass spectrometer.

The ionization source may further include an assembly to provide a counter gas, also known as curtain gas, (e.g., N2 or zero-air, which is essentially purified, hydrocarbon free lab-air), which can shrink the droplets and reduce the entry of background ions (e.g., solvent clusters) into the MS. The assembly can have a counter plate and an orifice assembly for providing the counter gas. The ionization source may further include an assembly to provide an auxiliary gas, also known as heater gas. In order to optimize ionization conditions, it is also possible to adjust solvent composition by adding a make-up flow directly before the ionization source to adjust pH, salts, buffers or organic content. Such ionization sources are known in the art and not further elucidated here.

The term "liquid" in relation to the FIS effluent refers to samples or other analytes (e.g., a dummy analyte, which may be a pre-given substance with a well-known chemical structure) directly injected into the ionization source without preliminary chromatographic separation of said samples. In alternative examples, samples may be subjected to prior chromatographic separation and thus the liquid may refer to liquids commonly used in liquid chromatography (LC) techniques such as solvents or mixtures of solvents used as mobile phases or LC eluents (elution solvents), and others as known in the art.

The term "sample" refers to a biological material suspected of containing one or more analytes of interest and whose detection, qualitative and/or quantitative, may be associated to a particular condition (e.g., a clinical condition). The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution, or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest. Examples of analytes of interest are vitamin D, drugs of abuse, therapeutic drugs, hormones, and metabolites, in general. The list is however not exhaustive.

According to some examples, a flow injection system can include a liquid chromatography (LC) system connected to an ionization source. In some examples the ionization source, which is coupled to the MS, may be connected with the LC system via the valve-to-detector conduit. In some examples, the LC system can be configured as an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ionized current in the individual mass scans and plotting that "total" ion current as an intensity point against time.

The term "liquid chromatography or LC" as used herein can refer to any kind of an analytical process that subjects samples injected by a sample injector to chromatographic separation through an LC column, e.g., in order to separate analytes of interest from each other and therefore to enable their individual detection, for instance, by means of a mass spectrometry detection. In other examples, said analytical process also aims at separating analytes of interest from matrix components, e.g., remaining matrix components after sample preparation that may still interfere with a subsequent detection. In some examples, such forms of liquid chromatography is used as liquid chromatography performed under pressure, e.g., "high-performance liquid chromatography" or HPLC, "ultra-high-performance liquid chromatography" or UHPLC, "micro liquid chromatography" or µLC and "small-bore liquid chromatography" or small-bore LC.

The term a "liquid chromatographic system or LC system" as used in the present disclosure is an analytical apparatus or module or a unit in an analytical apparatus for carrying out liquid chromatography. The LC system may be embodied as a single channel or as a multi-channel system that may comprise one or a plurality of LC columns arranged in parallel and/or in series. The LC system may also comprise elements such as a sample injector, valves, liquid sources, fluidic connections and parts, e.g., for mixing liquids, degassing liquids, tempering liquids, and the like, one or more sensors, such as pressure sensors, temperature sensors and the like, and especially at least one LC pump. The list is not exhaustive.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "LC column" may also refer to capillaries or channels that are not packed or loaded with a stationary phase but rely on the surface area of the inner capillary wall or geometrical structures to effect separations. An example is provided by pillar array chromatography, where separation beds are formed by etching away interstitial volumes out of a solid silicon wafer, leaving an array of pillars. The resulting channels can be folded onto a small footprint by concatenating bed segments with optimized flow distributors that limit peak dispersion. This creates a stationary phase support structure that is organized in a reproducible, ordered pattern.

A composition of the mobile phase, i.e., concentrations of solvents or mixtures of solvents constituting the mobile phase and aiming at carrying a sample through the stationary phase of the LC column, may be a function that changes over time. Such a chromatographic separation process can be referred to as gradient elution. The desired time-dependence of the composition entering the LC column during the gradient elution can be programmed in advance in some examples.

The term "LC eluate" exiting an LC column is herein used to indicate a fraction of the eluate that comprises at least one analyte of interest.

The term a "fluidic stream" may refer to a fluidic path through which liquids can flow and in particular through which a sample from a sample injection point may undergo a chromatographic process and can eventually be transferred to a mass spectrometer.

In order that the embodiments of the present disclosure may be more readily understood, reference is made to the following examples, which are intended to illustrate the disclosure, but not limit the scope thereof.

Figure 4:
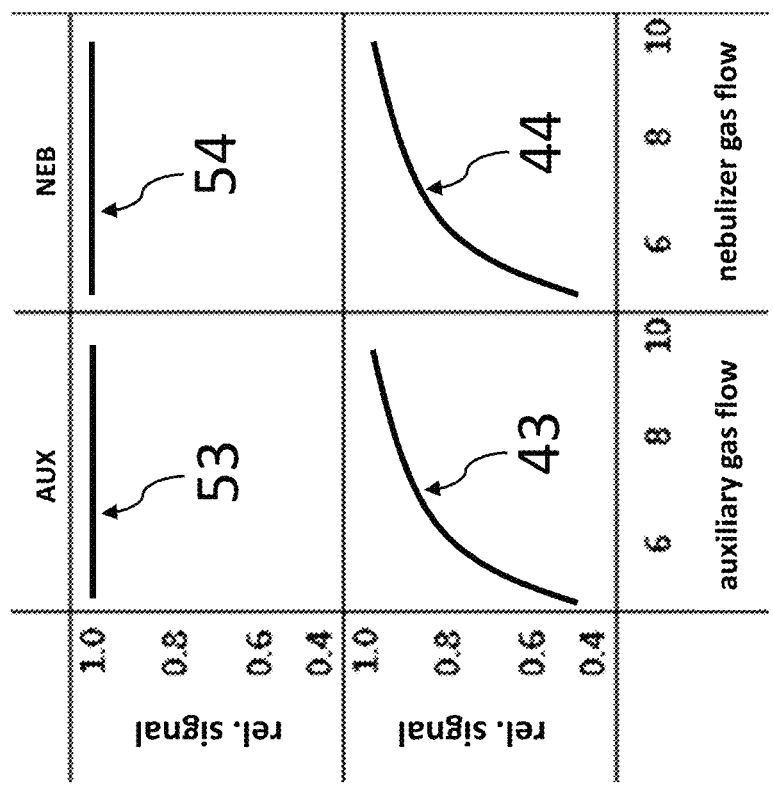
FIG. 4 is an example showing an MS signal of an analyte measured by the mass spectrometer versus the flow rates of a nebulizer and an auxiliary gas flow. The MS signal is normalized to its maximal value within the considered flow rates interval in accordance with an embodiment of the present disclosure.
Figure 5:
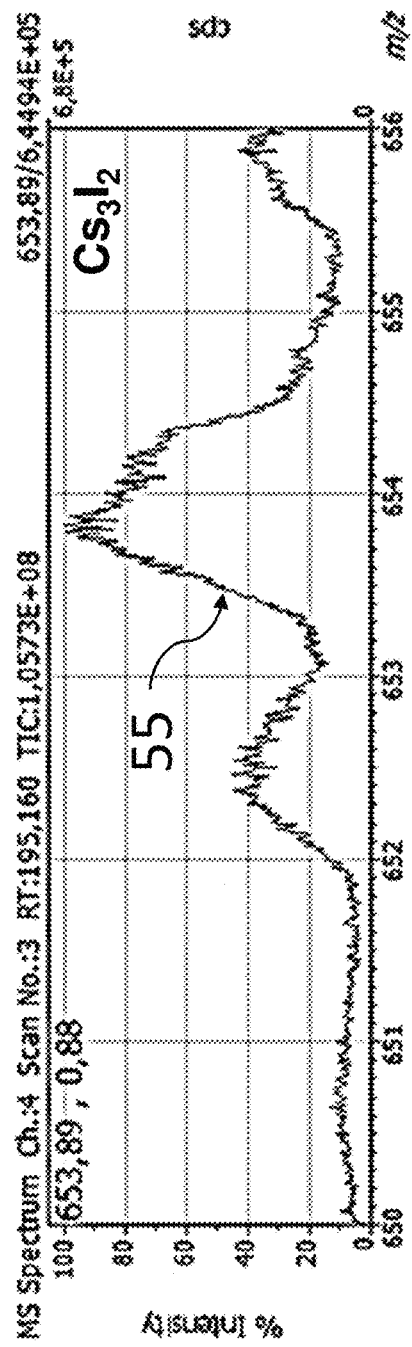
FIG. 5 displays another experimental example showing an MS signal of an analyte (on the example of cesium iodide Cs3I2) as a function of the measured mass-to-charge ratios (m/z) in accordance with an embodiment of the present disclosure.
Figure 5:
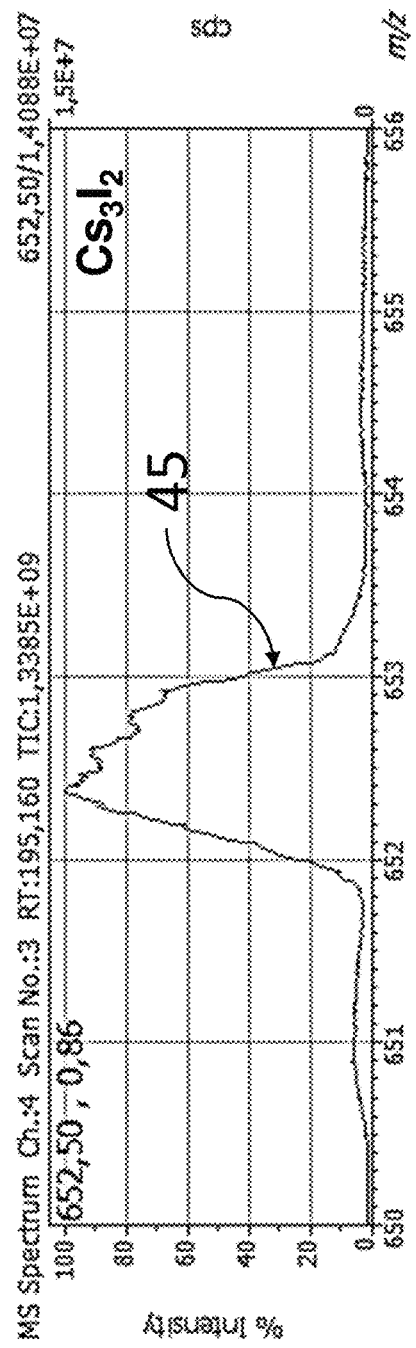

First, a general overview over the techniques of the present disclosure will be given in connection with FIG. 1. Then, different aspects of the MS techniques of the present disclosure will subsequently be summarized in a flow chart shown in FIG. 2. Next, some typical measurement results in the context of the MS techniques disclosed herein will be demonstrated in connection with FIGS. 3 to 5. Last, some further aspects of the present disclosure will be given in connection with FIG. 6 when a flow injection system of the MS apparatus comprises a liquid chromatographic (LC) system.

FIG. 1 includes a schematic example of an MS apparatus 1 according to the present disclosure. The MS apparatus (e.g., an MS based analyzer) comprises a mass spectrometer 10 (e.g., a triple quadrupole mass spectrometer) and an ionization source 20 coupled to the mass spectrometer. The MS apparatus further comprises a flow injection system (FIS) 30 coupled to the ionization source 20. The ionization source of the present disclosure can be configured to provide an ionized gas flow of an analyte towards an entrance 11 of the mass spectrometer. In one example, a liquid 31 leaving the FIS (i.e., the FIS effluent) can comprise an analyte and it can be guided into the ESI source so that the liquid is nebulized in a volume downstream of the sprayer needle or capillary 25 where ionization occurs, resulting in the production of a gaseous phase of charged molecules that constitute said liquid. In other examples, the analyte of the present technique can be supplied by other units of the MS apparatus, for instance, by an MS pump configured to inject the analyte into the ionization source 20. In this case, the analyte can also be subsequently ionized in the ionization source. In addition or alternatively, a liquid 31 exiting the FIS can include a sample or several samples, liquid chromatographic eluates, etc., which can be guided into the ESI source. A nebulizer gas 23 (e.g., N2) may be used to create a spray of charged droplets of the analyte. In one example, the nebulizer gas 23 may flow substantially in the direction towards the entrance 11 of the mass spectrometer 10 starting from a sprayer needle or capillary 25 of the ionization source. In some examples, the ionization source 20 may further include an assembly configured to provide a counter gas (e.g., N2), which can shrink the droplets and reduce the entry of background ions (e.g., solvent clusters) into the MS. For instance, this assembly can include a counter plate 12 and an orifice assembly 13 for providing the counter gas 22. In some other examples, the ionization source can further include an assembly configured to provide an auxiliary gas 24. In some examples, the entrance of the mass spectrometer (MS) is an inlet for passing the ionized gas flow of the analyte into the MS.

In the present techniques, the ionization source can be configured to provide a second gas flow. In one example of the present technique, a counter gas flow 22 can be selected as the second gas flow. In other examples, the second gas flow can be a nebulizer gas flow 23. In still other examples, an auxiliary gas flow 24 can be taken as the second gas flow. All these examples are described in detail below in connection with FIGS. 3 to 5.

The MS apparatus is configured to measure a mass spectrometer (MS) signal of the analyte (for the purposes of detecting "determine a condition of the apparatus"). In some examples, this measurement can be a dedicated measurement for the purposes of detecting "determine a condition of the apparatus". In other examples, the measurement and the resulting MS signal can be used for the purposes of "detecting determine a condition of the apparatus" and also for other purposes (e.g., further checks of the apparatus). The measurement can happen in various different ways, and, as a consequence, the MS signal can take different forms. In some examples, measuring the MS signal can include multiple measurements with different parameters of the MS apparatus (e.g., gas flow parameters). In some examples, the MS signal can be given in the form of a mass spectrum of the analyte represented by an intensity as a function of the mass-to-charge ratio, m/z, in a predetermined interval of m/z. In some examples, the predetermined interval of m/z can be chosen such that it captures one or more features of the MS signal (e.g., one or more peaks or their values showing up in a profile of the MS signal within the predetermined interval of m/z). In other examples, a single value of m/z can be chosen (i.e., the predetermined interval effectively shrinks to a single value). In some other examples, the predetermined interval of m/z can be taken to capture all values of the MS signal that are substantially non-zero, for example, those values of the MS signal that are larger than a predetermined threshold value (the threshold value can, e.g., correspond to a noise level). In this case the MS signal is effectively considered in the whole range of m/z (i.e., the whole spectrum of the MS signal comes into play). In other examples, the MS signal includes one or more discrete values (e.g., of an intensity). In some examples, the mass spectrum can represent a measurement result at a predetermined point in time. In some other examples, the mass spectrum can be an averaged mass spectrum obtained by averaging two or more mass spectra measured in individual mass scans for different points of time within a predetermined time window (e.g., to smear out outliers, individual irregularities or noisy background of the MS signal).

In a next step, the techniques of the present disclosure can include analyzing a dependency of the MS signal of the analyte versus a parameter of the second gas flow. As mentioned above, the counter gas, the nebulizer gas or the auxiliary gas flow can be selected for this purpose in some examples. In some examples, the analyzing step of the present techniques can be performed in accordance with the following measurement/analysis protocol. The parameter of the second gas flow (for example, a flow rate of the second gas) can be varied in time (i.e., the parameter of the second gas flow may be a function of time). In some examples, the parameter of the second gas flow can increase from a predetermined minimal to a predetermined maximal value set prior to the measurement procedure. In other examples, the procedure can be performed in reverse order, i.e., starting from the maximal value and proceeding to the minimal value for the parameter of the second gas flow. In yet other examples, the parameter of the second gas flow can be randomly changed between the maximal and minimal values. Regardless of how exactly the parameter of the second gas flow is varied, for each chosen value of the parameter of the second gas flow from a plurality of discrete values lying between the maximal and minimal values, the MS signal of the analyte can be measured in accordance with the discussions presented in the previous paragraph. The analyzing step of the present technique can then include collecting the values of the MS signal of the analyte (represented, e.g., by an intensity) for the plurality of the discrete values of the parameter of the second gas flow. For instance, intensity values of the MS signal of the analyte can be collected at any single value of m/z (or an average over an m/z range around this chosen value). In typical examples, intensity values of the MS signal of the analyte can be collected at a predetermined single value of m/z (or an average over an m/z range around the predetermined value) or at a predetermined mass-to-charge ratio (m/z) measurement range, where the mass-to-charge ratio(s) of ions from the ionized gas of the analyte are expected to appear in the resulting mass spectrum. In some examples, the predetermined mass-to-charge ratio measurement range or the predetermined single value of m/z can correspond to the most prominent feature of the MS signal of the analyte. In other examples, a plurality of intensities at a plurality of mass-to-charge ratios, m/z, can be taken to analyze the dependency of the MS signal. Following this procedure, the MS signal of the analyte can be found and analyzed as a function of a parameter of the second gas flow. In one example, the parameter of the second gas flow can be a flow rate of the second gas. In other examples, another parameter, e.g., as a pressure of the second gas, can be selected as the parameter of the second gas flow. Two or more parameters of the second gas flow can also be combined in some examples (e.g., by calculating a weighted sum or a score).

In other examples, the MS apparatus can be configured to analyze a dependency of the MS signal of the analyte versus a state of the second gas flow. A "state of the second gas flow" can be any condition of the second gas flow or a quantity characterizing the second gas flow. In one example, a state of the second gas flow can be one of two states (including a leaky or non-leaky state of the second gas flow). In still other examples, a state of the second gas flow can be one of more than two states (e.g., more than two states each characterizing a certain degree of leakiness of the second gas flow). For instance, a leaky state of the counter gas 22 can be caused by a missing or loosely closed cap in the MS apparatus, in which case the counter gas can leak into the exterior of the MS apparatus. In other examples, a leaky state can occur as a result of leaky fitting between a flow controller and an outlet of the counter gas. In still other examples, the counter gas can leak somewhere else into the exterior or interior of the MS apparatus. To analyze the MS signal of the analyte for different states of the second gas flow, similar measurement steps of the MS signal as for the previous case discussed above can be carried out to obtain mass spectra of the analyte. Then, in typical examples, the MS signal of the analyte can be collected in the whole range of m/z rather than at a predetermined single value of m/z (or an average over an m/z range around the predetermined value) or at a predetermined mass-to-charge ratio measurement range. By doing so the properties of the MS signals can be analyzed for different states of the second gas flow. In some examples, if the second gas flow is in one particular state (e.g., in a non-leaky state), then the MS signal can be characterized by one or more features indicative of precisely this state. However, when the second gas flow is in another state (e.g., in a leaky state), for example, at some later or earlier measurements, one or more other features of the MS signal may be a hallmark of the other state.

In a further step, the technique of the present disclosure can include determining a condition of the apparatus (e.g., normal or abnormal condition or an error condition) based on the analyzed dependency. In one example, this determination step can result in detecting irregularities or changes in the MS signal versus the parameter of the second gas flow that are the signature of a certain condition of the MS apparatus (e.g., if a leak is present). In other examples, the determination step can lead to detecting irregularities or changes in the structure of the MS signal versus the state of the second gas flow that are the signature of a certain condition of the MS apparatus (e.g., if a leak is present). In both alternatives the detected irregularities or changes can serve as an indicator that the condition of MS apparatus is abnormal having a malfunction (e.g., such a malfunction can be caused by a leakage of one or more gas flows used in the ionization source of the MS apparatus), or that a particular error has occurred or is likely to occur.

Figure 2:
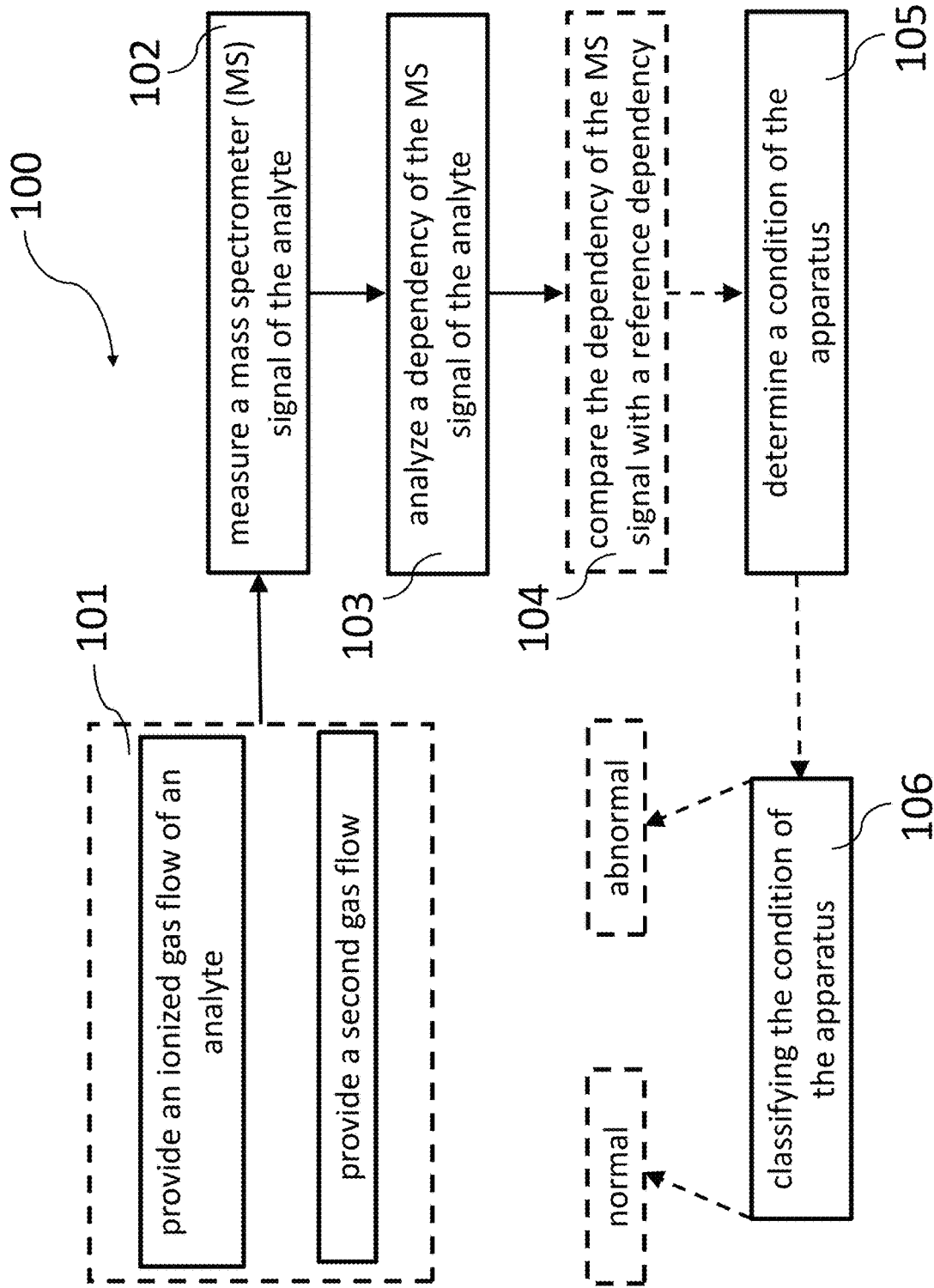
FIG. 2 is a flow diagram illustrating the method for chemical analysis in the MS apparatus in accordance with an embodiment of the present disclosure.

Further disclosed and proposed is a method for chemical analysis in a mass spectrometry (MS) apparatus schematically shown in FIG. 2 with continued reference to FIGS. 3 to 6, the method comprising providing 101 an ionized gas flow of an analyte towards an entrance of a mass spectrometer by an ionization source and providing a second gas flow by the ionization source. The techniques of the present disclosure further comprise measuring 102 a mass spectrometer (MS) signal of the analyte by the mass spectrometer. The next step of the method includes analyzing 103 a dependency of the MS signal of the analyte versus a parameter of the second gas flow or a state of the second gas flow. In a further step, the method of the present disclosure involves determining 105 a condition of the apparatus based on the analyzed dependency.

In some examples of the present techniques, analyzing 103 the dependency of the MS signal of the analyte includes comparing 104 the dependency of the MS signal of the analyte with a reference dependency. In some examples, the reference dependency can be the dependency of the MS signal of the analyte measured at a particular point in time (e.g., after setup or maintenance of the MS apparatus 1), when the MS apparatus is believed to operate normally without any malfunction. In other examples, the reference dependency of typical analytes can be estimated and/or a calculated for a specific MS apparatus in use (e.g., based on information regarding the configuration of the MS apparatus and/or data measured on the MS apparatus). In yet other examples, the reference dependency can alternatively or additionally include knowledge about typical features characterizing a profile of the MS signal of the analyte versus the parameter of the second gas flow or the state of the second gas flow, when the MS apparatus operates under a normal or abnormal condition. One example of such typical features can be a monotonic behavior of the MS signal (e.g., a monotonic increase or decrease of the MS signal versus the parameter of the second gas flow) as a function of the parameter of the second gas flow (e.g., the MS signal can demonstrate only an increasing or decreasing behavior versus the flow rate of the second gas in the predetermined measurement interval). In other examples, the MS signal can possess a single peak when the second gas is in one of the possible states (e.g., in a non-leaky state), whereas the profile of the MS signal can have two or more peaks when the second gas is in another state (e.g., in a leaky state). Alternatively or additionally, a value of the MS signal of the single peak can be larger than a predetermined threshold value for said non-leaky state, while for the leaky-state a value of the MS signal at the peak having a maximal value among the two or more peaks can be smaller than the predetermined threshold value. The reference dependency of the analyte can be stored in a database and retrieved from the database of the MS apparatus when the analyzing 103 step is carried out.

The step of determining the condition of the MS apparatus can include classifying 106 the condition of the apparatus as being normal without a malfunction or abnormal having the malfunction. In some examples, the step of determining can include determining that the apparatus is in an error condition. In some examples, the malfunction can be a leakage of the second gas flow. In some other examples, the error condition can be the leakage of the second gas flow. In both cases the condition of the MS apparatus can be referred to as a leakage condition of the apparatus. In yet other examples, the error condition is caused by a reason different from the leakage of the second gas flow. For example, the error condition may be caused by gradual contamination or corrosion of the sprayer needle or capillary 25 or by gradual clogging or aging of some other elements in the MS apparatus. Therefore, in some examples, the error condition of the apparatus may be considered less critical than the leakage condition of the apparatus.

In still other examples of the present techniques, determining a condition of the apparatus can include quantifying the condition of the apparatus or classifying the condition of the apparatus into plurality of categories. For example, a leakage of the second gas flow can be quantified based on the deviation of the measured MS signal from the reference dependency discussed above. In one example, the deviation of a profile of the measured MS signal from the reference dependency can be employed for this purpose. In other examples, one or more features characterizing the profile of the MS signal and the reference dependency can be compared with each other in order to quantify the leakage. In one example, an estimated relative error (defined, e.g., in percent as a ratio between the difference of the measured MS signal and the reference dependency to the reference dependency) may lie within an admissible error. In this case, the condition of the apparatus can be classified as "normal" or "tight". In other examples, the estimated relative error can be larger than a first predetermined value (e.g., 10% or 15%), but less than a second predetermined value (e.g., 20% or 25%). Therefore, the condition of the apparatus can be referred to as a "lightly leaking" condition. In still other examples, the estimated relative error can be larger than a third predetermined value (e.g., 20% or 25%), but less than a fourth predetermined value (e.g., 30% or 35%). For this situation, the condition of the apparatus can be classified as a "moderately leaking" condition. It is understood that classifying the condition of apparatus as being "tight", "lightly leaking" or "moderately leaking" is only an example, and a number of other different categories can be contemplated in this context.

In other examples, determining a condition can include predicting a point in time when the apparatus will be in an error state (e.g., a leak of a predetermined magnitude will have formed). This can involve classifying the condition of the apparatus as worsening or deteriorating.

In the present disclosure, the analyzing and determining steps can be carried out by a controller of the MS apparatus (e.g., by a controller of an MS based analyzer). The controller can be implemented in any suitable form (e.g., using any suitable hardware or software).

The techniques of the present disclosure can include automatically triggering a response based on the determined condition. In accordance with the discussions above, the determined condition may be quantified or classified on different categories. Therefore, triggering the response can lead to different notifications or result in various outcomes in the operation of the MS apparatus. In some examples, the response can include indicating the condition on a graphical user interface and/or providing information regarding the condition to a remote device. In addition or alternatively, the response can involve generating an alarm and/or changing or stopping the operation of the MS apparatus, for instance, if the leakage condition of the apparatus was determined. Therefore, in some examples the leakage condition can be considered as the critical condition. In other examples, the alarm and/or changing or stopping the operation of the MS apparatus can occur only starting from the condition of the apparatus classified as the "moderately leaking" condition (i.e., for the "lightly leaking" condition disclosed above, the alarm will not be alerted and the MS apparatus can continue to operate). In other examples, the response can involve generating a warning message, e.g., if the condition of the apparatus is classified to be the "lightly leaking" condition. In other examples, the response can involve generating a warning message if the apparatus is in the error condition associated with the reason different from the leakage of the second gas flow. Thus, in some examples, the error condition can be considered as non-critical so that the MS apparatus may continue to operate. In addition or alternatively, the response can include transmitting a message to a remote device (e.g., a message confirming normal operation of the MS apparatus or an error message regarding the condition of the MS apparatus) and/or scheduling a maintenance operation (e.g., based on a prediction that the apparatus will be in an error state at some point in time). In other examples, the response can include indicating to an operator that the apparatus operates normally when the classified condition is normal or the apparatus needs assistance when the classified condition is abnormal. In some examples, depending on the outcome of the response the operator can undertake appropriate actions.

In some examples of the present disclosure, the analyte can be selected so that the MS signal of the analyte is a variable depending on the parameter of the second gas flow or the state of the second gas flow. In typical examples, the parameter can be a flow rate of the second gas flow or the state can be a state of the flow rate of the second gas flow. For example, the analyte can be selected so that the MS signal of the analyte drops with an increasing flow rate of the second gas when the malfunction is absent or increases with an increasing flow rate of the second gas when the malfunction is absent.

The ionization source of the present techniques can further comprise a counter gas source configured to provide a counter gas flow 22 of a counter gas outwards the entrance 11 of the mass spectrometer 10. In this case, the counter gas may correspond to the second gas, and therefore the second gas flow is the counter gas flow. In some examples, at least part of the ionized gas flow 21 of the analyte flows in a first direction towards the entrance 11 of the mass spectrometer 10, and at least part of the counter gas flow 22 flows in a second direction outwards the entrance of the mass spectrometer, wherein the first direction is different from the second direction (see FIG. 1), so that the part of the ionized gas flow of the analyte can intersect with the counter gas flow.

Figure 3:
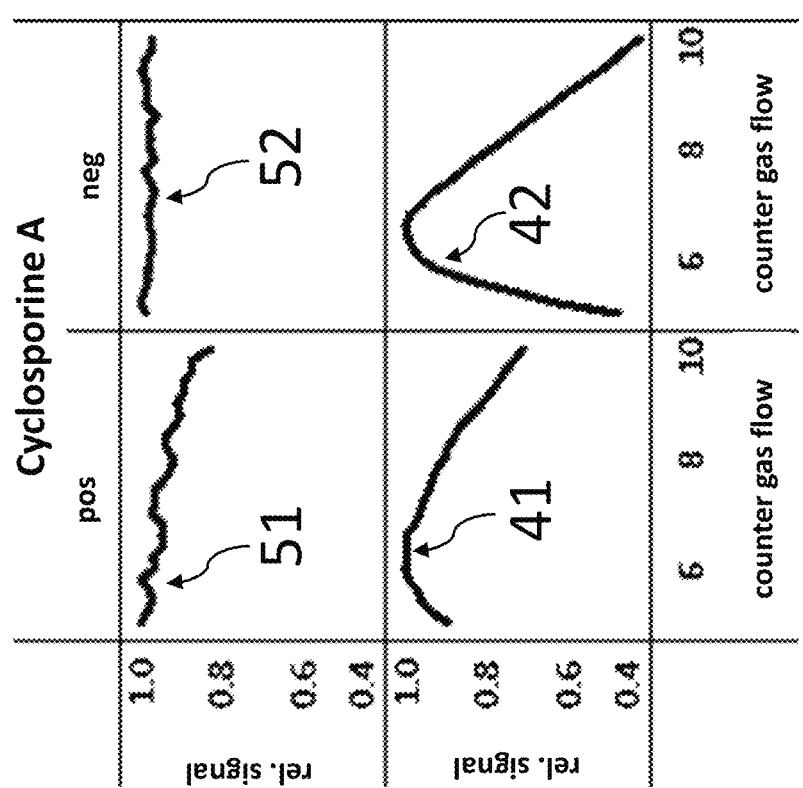
FIG. 3 is an experimental example showing an MS signal of an analyte (in this example cyclosporine A) measured by the mass spectrometer operating in a positive or negative mode versus the flow rates of a counter gas. The MS signal is normalized to its maximal value observed within the considered flow rates interval in accordance with an embodiment of the present disclosure.

In one example of the present techniques, the condition of the apparatus can be classified as non-leaky if the MS signal of the analyte decreases with increasing flow rates of the counter gas. For the sake of illustration, this scenario is demonstrated in the two lower panels of FIG. 3, which show normalized intensity profiles of the MS signal of the analyte versus the flow rate of the counter gas at fixed values of m/z measured by the mass spectrometer operating in a positive or negative mode. The values of the mass-to-charge ratio in the example of FIG. 3 are chosen to be m/z=1202.849 or 1200.834 in this example, when the mass spectrometer operates in a positive or negative mode, respectively. In this example cyclosporine A was taken as the analyte, which is a cyclic polypeptide consisting of large molecules (eleven amino acids) and having a molecular mass of 1202 Da. Since cyclosporine A is a large-molecule analyte, it is expected that the resulting measured intensity of the MS signal should ultimately tend to decrease at higher flow rates of the counter gas. This behavior can be explained by the fact that high flow rates of the counter gas 22 can prevent the large molecules (in this example molecules of cyclosporine A) from getting behind the counter plate 12 towards the MS. This scenario is indeed realized on the example shown in two lower panels of FIG. 3: In both cases an intensity profile of the MS signal 41, 42 exhibits a maximum at a certain value of the flow rate of the counter gas, whereas above this value the MS signal of the analyte drops with an increasing flow rate. Since the measured MS dependencies of the MS signal are in agreement with the expectation, the condition of the apparatus can be classified as non-leaky in this case.

In addition or alternatively, the condition of the apparatus can be classified as leaky if the MS signal of the analyte is substantially independent on the flow rate of the counter gas. Returning to FIG. 3, this scenario is demonstrated on two upper panels: In both cases, an intensity profile of the MS signal 51, 52 remains substantially unchanged within the considered interval of the counter gas flow rates. This behavior can indicate that the flow rates of the counter gas are overestimated, i.e., the ionized gas flow of the analyte (cyclosporine A) in the ionized source before entering the mass spectrometer experiences lower values of the counter gas flow than expected due to, for example, a leakage in the MS apparatus. Therefore, the condition of the apparatus can be classified as leaky.

In other examples of the present techniques, the second gas can be a nebulizer gas 23 or an auxiliary gas 24 used in the ionization source. In one example, the nebulizer gas can be used to create a spray of charged droplets of the analyte, for instance, when only the analyte is supplied to the ionization source (e.g., via the FIS or a pump of the MS). In other examples, the nebulizer gas can be used to get a spray of charged droplets of both the analyte and the liquid (e.g., the liquid comprising a second analyte) emerging from the FIS. The auxiliary gas is usually used to influence the cooling rate and the evaporation process of the droplets.

In one example, the condition of the apparatus can be classified as non-leaky if the MS signal of the analyte increases with increasing flow rates of the nebulizer gas or the auxiliary gas. This possible scenario contemplated by the present disclosure is illustrated by the example of two lower panels in FIG. 4, which show normalized intensity profiles of the MS signal of the analyte versus the flow rate of the nebulizer gas 23 and the auxiliary gas 24 measured by the mass spectrometer. In one example, the nebulizer gas 23 can flow substantially in the direction towards the entrance 11 of the MS 10 starting from a sprayer needle or capillary 25 of the ionization source (see FIG. 1). If the MS is in the normal condition without malfunction, one can expect that the higher the flow rates of the nebulizer gas, the larger the measured MS signal of the analyte will be. This can be explained by the fact that higher flow rates of the nebulizer gas can facilitate a more efficient creation of a spray of the analyte. Additionally or alternatively, the auxiliary gas 24 can also flow in the same direction towards the entrance 11 of the MS 10 after exiting the sprayer needle or capillary 25. The same tendency with respect to the flow rates of the auxiliary gas can hold true, as an increase in the auxiliary gas flow rates can lead to a more efficient evaporation of the analyte. In some examples, flow rates of auxiliary gas and nebulizer gas can be varied independently. In one example, the nebulizer gas and the auxiliary gas can emanate from the same point (e.g., from an outlet of the corresponding pipe). In other examples, the nebulizer gas and the auxiliary gas can emanate from points that are spatially separated from each other (for example, from the outlets of two different pipes supplying the nebulizer and auxiliary gas). Therefore, based on the dependencies of the MS signal of the analyte displayed on two lower panels of FIG. 4 (see two curves 43, 44 on this figure), the condition of the MS apparatus can be classified as non-leaky.

In addition or alternatively, the condition of the apparatus can be classified as leaky if the MS signal of the analyte is substantially independent on the flow rate of the nebulizer gas or the auxiliary gas. Returning to FIG. 4, this scenario is demonstrated on two upper panels: In both cases an intensity profile of the MS signal 53, 54 remains substantially unchanged within the considered interval of the flow rates of the nebulizer gas 23 and the auxiliary gas 24. This behavior can indicate that the flow rates of the nebulizer gas (right upper panel of FIG. 4) or the auxiliary gas (left upper panel of FIG. 4) are overestimated, i.e., the actual values of the flow rate at which the analyte (cyclosporine A) ultimately flows into the MS may be lower than expected and cannot provide an expected spray or evaporation level of the analyte—an effect that can be attributed, for instance, to a leakage in the MS apparatus. Therefore, the condition of the apparatus in this case can be classified as leaky.

The techniques of the present disclosure can include embodiments when the MS signal of the analyte may have a first feature in a predetermined mass-to-charge ratio (m/z) measurement range if the second gas flow is in a non-leaky state. In this case, analyzing the dependency of the MS signal of the analyte can include determining if the first feature is present. In one example, the first feature can be a single peak of the MS signal in the predetermined mass-to-charge ratio (m/z) measurement range. In other examples, the first feature can be a maximal value of the MS signal in the predetermined mass-to-charge ratio (m/z) measurement range that is larger than a predetermined threshold value. In yet other examples, the first feature can be both a single peak of the MS signal and a maximal value of the MS signal (e.g., a value of the MS signal at the single peak) that is larger than a predetermined threshold value. In some examples, the second gas can be a nebulizer gas. In other examples, the second gas can be an auxiliary gas or another gas used in the MS apparatus. In the example of the lower panel in FIG. 5, an intensity profile of the MS signal 45 of the analyte is depicted as a function of the mass-to-charge ratio (m/z), which features substantially a single peak at the value of m/z around 652.5 with the value of the MS signal approximately equal to 1.5×107 at this peak. In the present example, the cesium iodide, Cs3I2, is taken as the analyte and the second gas is the nebulizer gas. In some examples it can be preliminary found that, for example, a single peak in the profile of the MS signal and/or its value larger than the predetermined threshold value is a hallmark of the nebulizer gas being in a non-leaky state, and thereby the apparatus can be classified as non-leaky.

In addition or alternatively, the MS signal of the analyte can possess a second feature in the predetermined mass-to-charge ratio (m/z) measurement range if the second gas flow is in a leaky state. In this case, analyzing the dependency of the MS signal of the analyte can include determining if the second feature is present. For example, the second feature can be two or more peaks of the MS signal in the predetermined mass-to-charge ratio (m/z) measurement range. In other examples, the second feature can be a maximal value of the MS signal in the predetermined mass-to-charge ratio (m/z) measurement range that is smaller than a predetermined threshold value. In yet other examples, the second feature can be both two or more peaks of the MS signal and a maximal value of the MS signal (e.g., a value of the MS signal at the peak having a maximal value among the two or more peaks) that is smaller than a predetermined threshold value. In some examples, the second gas can be a nebulizer gas. In other examples, the second gas can be an auxiliary gas or another gas used in the MS apparatus. One of the possible scenarios is exemplified on the upper panel in FIG. 5, where the second gas is the nebulizer gas and an intensity profile of the MS signal 55 of the analyte (Cs3I2) features substantially three peaks at the values of m/z around 652.5, 653.8 and 655.9. In the present example, the value of the MS signal at the peak having a maximal value (a central peak among the three peaks) is approximately equal to 6.8×105, which is more than an order of magnitude smaller than that observed for the single peak of the MS signal shown on the lower panel of FIG. 5. In some examples, it can be preliminary determined that two or more peaks in the profile of the MS signal and/or a value of the MS signal at the peak having a maximal value smaller than the predetermined threshold value is a signature of the nebulizer gas being in a leaky state, and thereby the apparatus can be classified as leaky. In general, the second feature can be different from the first feature.

It is understood that that the profiles of the MS signal of the analyte shown in FIGS. 3 to 5 are only several possible embodiments of the present technique, as different analytes, parameters of the second gas flow and configurations of the MS apparatus may also be contemplated by the present disclosure.

In some examples of the present techniques, the analyte can comprise a dummy analyte. Specifically, the dummy analyte can be selected to generate the MS signal exhibiting the dependency versus the parameter of the second gas flow or the state of the second gas flow (e.g., the dependencies similar to those discussed in detail above in connection with the embodiments of FIGS. 3 to 5). For instance, in the examples of FIGS. 3 to 5 both cyclosporine A and the cesium iodide, Cs3I2, can be referred to as the dummy analyte, since they are pre-given substances with a well-known chemical structure that can be used in the present techniques to facilitate determining a condition of the apparatus in the sense elucidated in detail above. Thus, in some examples the dummy analyte can include cesium iodide, Cs3I2. In other examples, the dummy analyte can include cyclosporine A. In yet other examples, the cesium iodide can be given by a general chemical formula, Csn+1 In or CsnIn+1, wherein n stands for a non-negative integer. In still other examples, dummy analytes other than cyclosporine A or the cesium iodides can be selected for the present techniques. For example, the dummy analyte can include large molecules with a molecular mass larger than 500 Da.

Figure 6:
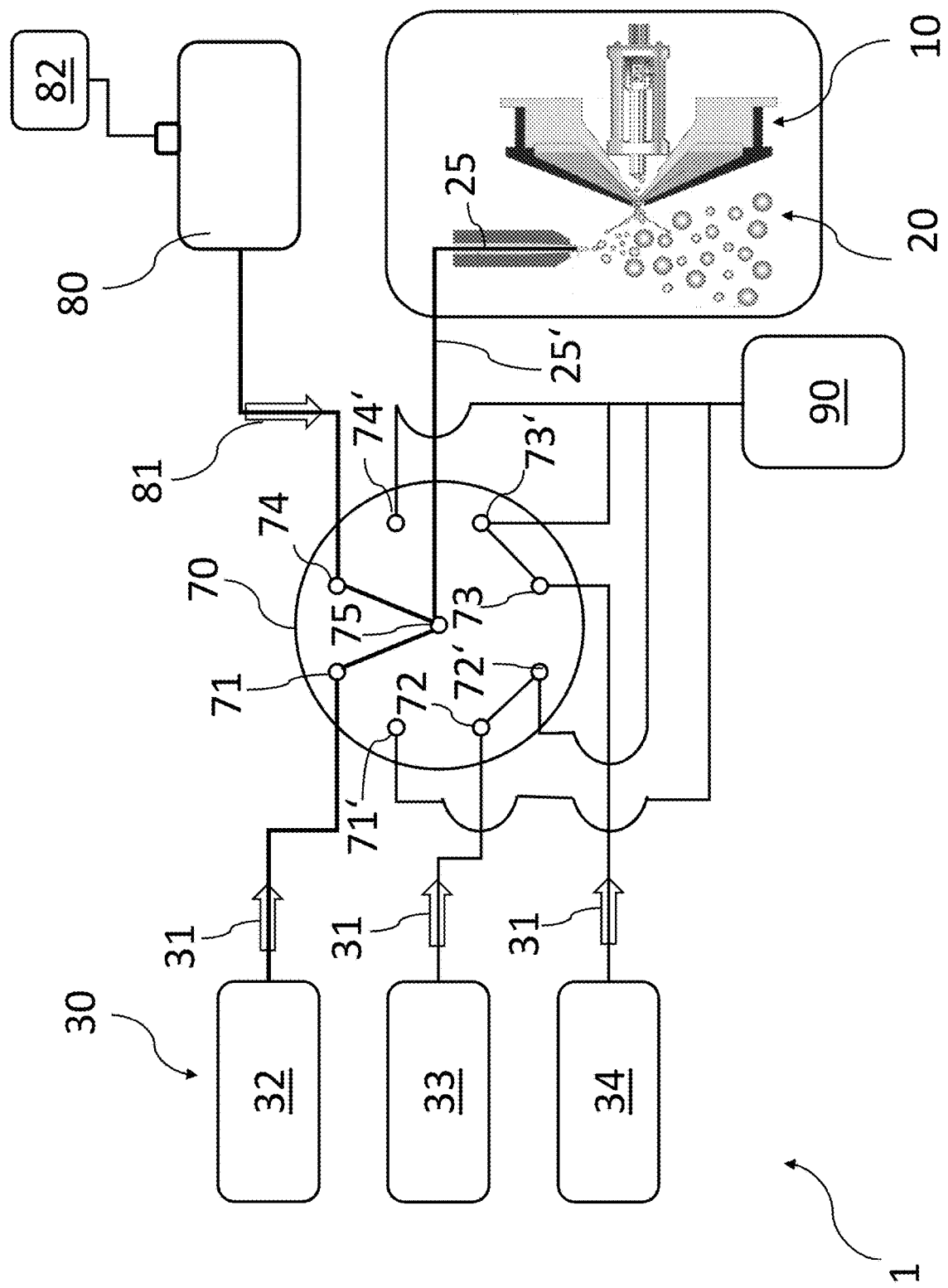
FIG. 6 shows schematically a FIS comprising a liquid chromatographic (LC) system connected to the ionization source displayed in FIG. 1 in accordance with an embodiment of the present disclosure.

The MS apparatus of the present techniques can include a dedicated flow-path for providing the dummy analyte to the ionization source. For this purpose, the MS apparatus can, for instance, further comprise a dedicated reservoir to provide the dummy analyte. In some examples, the dedicated flow-path can be a flow path, which is one of the fluidic paths of the FIS, i.e., the dummy analyte may be guided into the ionization source by the FIS. In some other examples, the dedicated flow-path can be a flow path, which is different from fluidic paths provided by the flow injection system (FIS). In this case, the dummy analyte can be supplied to the ionization source by a unit of the MS apparatus which is different from the FIS. For instance, the MS apparatus can include a dummy analyte pump 80 configured to pump the dummy analyte (e.g., cyclosporine A, cesium iodide, etc., as mentioned above) into the ionization source 20. FIG. 6 includes a schematic example of an MS apparatus 100 that can be contemplated by the present disclosure in this context. In the lower right corner of FIG. 6 the mass spectrometer 10 and the ionization source 20 are shown, which are described above in connection with FIG. 1. In some examples, the dummy analyte pump 80 may be fluidically connected to a valve-to-detector conduit 25' via a stream-selection valve 70 (see FIG. 6). In some examples, the dummy analyte pump 80 can be configured to pump the dummy analyte (stored, for example, in a container 82) through the valve-to-detector conduit 25' into the ionization source 20 (e.g., into the ESI source). In the example of FIG. 6, the ESI source comprises a sprayer needle or capillary 25, which in some examples can form part of the valve-to detector conduit 25', so that the mass spectrometer is connected to the valve-to-detector conduit 25' via the ionization source 20. In other examples, the sprayer capillary may not necessarily be part of the valve-to detector conduit 25' and is connected to it in a manner known in the art. In some examples, the dummy analyte pump 80 can be a single piston pump connected to the ionization source 20.

The flow injection system of the present disclosure can include a liquid chromatographic (LC) system. In some examples, the LC system can comprise multiple fluidic streams 32, 33, 34 (e.g., two or more or three or more fluidic streams) alternately connectable to the ionization source 20 via the valve-to-detector conduit 25' through the stream-selection valve 70. In one example, each fluidic stream can be connected to the ionization source 20 during a predefined time window to let LC eluates flow through the valve-to-detector conduit 25' to the ionization source 20. In some examples, the analyte of the present disclosure can include the LC eluates flowing out of the LC system. The MS apparatus can also include different arrangements for connecting the dummy analyte pump and/or the multiple fluidic streams 32, 33, 34 to the ionization source 20. For example, the MS apparatus can include other stream selection elements than a (rotary) valve 70. In some examples, the LC system can include a capillary liquid chromatographic device.

In addition or alternatively, the MS apparatus of FIG. 6 can include multiple stream selection elements (e.g., stream selection valves). In addition, the LC system can include multiple groups of fluidic streams each including two or more fluidic streams connectable to the ESI source. In the example depicted in FIG. 6, the stream-selection valve 70 comprises a plurality of fluidic-stream ports 71, 72, 73 and 74 configured to alternatively connect a respective fluidic stream from the dummy analyte pump 80 and multiple fluidic streams 32, 33, 34 of the LC system with the valve-to-detector conduit 25' in order to provide the dummy analyte 81 or the LC eluates 31 flowing from the respective fluidic stream to be inputted into the ionization source. The liquid incoming into the ionization source can thus be nebulized in a volume downstream of the sprayer needle or capillary 25 where ionization occurs, resulting in the production of a gaseous phase of charged analyte molecules (see FIG. 6, lower right corner). In one example, the stream-selection valve 70 can comprise in addition a plurality of waste ports 71', 72', 73', 74' for each fluidic stream 32, 33, 34 from the multiple fluidic streams and for the dummy analyte pump 80 that lead to a waste 90. It is understood that the embodiment presented FIG. 6 is only an example and the number of ports and connections may be adapted in many different ways and in particular according to the number of fluidic streams.

The MS apparatus of the present disclosure can be configured to determine a condition of the apparatus based on the analyzed dependency upon predetermined trigger events or according to a predetermined schedule. In some examples, the trigger event can be a particular routine or operation carried out in the MS apparatus. For example, determining a condition of the apparatus can be carried out at one or more of the following occasions: 1) during the operation of the MS apparatus at predetermined points of time (e.g., in a regular or non-regular manner), 2) during a quality control routine of one or more units of the MS apparatus, 3) during a regular instrument check of the one or more units of the MS apparatus, 4) during a start-up procedure of the one or more units of the MS apparatus, 5) during a down-time of the one or more units of the MS apparatus, 6) during or after a service or maintenance operation of the one or more units of the MS apparatus or 7) by a decision of an operator. In some other examples, the trigger event may include a status change of the one or more units of the MS apparatus. In yet other examples, the trigger event can include a monitored parameter of the one or more units of the MS apparatus assuming a particular value or passing a particular threshold. In the techniques of the present disclosure, the measuring, analyzing, and determining steps can be carried out automatically upon occurring of the predetermined trigger events or according to the predetermined schedule. In typical examples, the present technique can include estimating a moment of time at which the malfunction or the error condition of the MS apparatus (e.g., a leakage) has occurred.

A number of aspects of the techniques related to a mass spectrometry apparatus for chemical analysis including a flow injection system (FIS) and an ionization source, where the flow injection system is coupled to the ionization source have been discussed in the preceding sections. In addition, the techniques of the present disclosure can also be carried out according to the following aspects:

Aspect 1: A mass spectrometry (MS) apparatus (1) for chemical analysis, the apparatus comprising:

a mass spectrometer (10);

an ionization source (20) coupled to the mass spectrometer;

a flow injection system (FIS) (30) coupled to the ionization source, wherein the ionization source is configured to provide an ionized gas flow of an analyte (21) towards an entrance (11) of the mass spectrometer, wherein the ionization source is further configured to provide a second gas flow (22; 23; 24) of a second gas;

wherein the apparatus is configured:

to measure a mass spectrometer (MS) signal of the analyte;

to analyze a dependency of the MS signal of the analyte versus a parameter of the second gas flow or a state of the second gas flow;

to determine a condition of the apparatus based on the analyzed dependency.

Aspect 2: The apparatus of aspect 1, wherein the parameter of the second gas flow is a flow rate of the second gas.

Aspect 3: The apparatus of aspect 1 or 2, wherein analyzing the dependency of the MS signal of the analyte includes comparing the dependency of the MS signal of the analyte with a reference dependency.

Aspect 4: The apparatus of any one of aspects 1 to 3, wherein determining the condition of the apparatus includes classifying the condition of the apparatus as being normal without a malfunction or abnormal having the malfunction, and/or determining that the apparatus is in an error condition.

Aspect 5: The apparatus of aspect 4, wherein the malfunction or the error condition is a leakage of the second gas flow, and wherein the condition of the apparatus is a leakage condition of the apparatus, or wherein the error condition is caused by gradual contamination or corrosion of the sprayer needle or capillary or by gradual clogging or aging of other elements in the MS apparatus.

Aspect 6: The apparatus of any one of aspects 1 to 5, wherein the apparatus is further configured to automatically trigger a response based on the determined condition.

Aspect 7: The apparatus of aspect 6, wherein the response includes one or more of:

indicating the condition on a graphical user interface;

providing information regarding the condition to a remote device;

generating an alarm or a warning message;

changing or stopping the operation of the apparatus; and transmitting a message to a remote device;

scheduling a maintenance operation; and generating a log entry.

Aspect 8: The apparatus of aspect 7, wherein the response includes indicating to an operator that the apparatus operates normally when the classified condition is normal or the apparatus needs assistance when the classified condition is abnormal.

Aspect 9: The apparatus of any one of aspects 1 to 8, wherein the analyte is selected so that the MS signal of the analyte is a variable depending on the parameter of the second gas flow or the state of the second gas flow, optionally wherein the parameter is a flow rate of the second gas flow or the state is a state of the flow rate of the second gas flow.

Aspect 10: The apparatus of any one of aspects 2 to 9, wherein the analyte is selected so that the MS signal of the analyte drops with an increasing parameter of the second gas flow, optionally with an increasing flow rate of the second gas when the malfunction is absent or increases with an increasing parameter of the second gas flow, optionally with an increasing flow rate of the second gas when the malfunction is absent.

Aspect 11: The apparatus of any one of aspects 1 to 10, wherein the ionization source further comprises a counter gas source configured to provide a counter gas flow of a counter gas outwards the entrance of the mass spectrometer, and wherein the second gas is the counter gas (22) and the second gas flow is the counter gas flow.

Aspect 12: The apparatus of aspect 11, wherein at least part of the ionized gas flow (21) of the analyte flows in a first direction towards the entrance (11) of the mass spectrometer (10) and wherein at least part of the counter gas flow (22) flows in a second direction outwards the entrance of the mass spectrometer, wherein the first direction is different from the second direction, so that the part of the ionized gas flow of the analyte intersect with the counter gas flow.

Aspect 13: The apparatus of aspect 2 and 11 or aspect 2 and 12, wherein the condition of the apparatus is classified as non-leaky if the MS signal of the analyte decreases with increasing flow rates of the counter gas (41; 42).

Aspect 14: The apparatus according to aspect 2 and any one of aspects 11 to 13, wherein the condition of the apparatus is classified as leaky if the MS signal of the analyte is substantially independent on the flow rate of the counter gas (51; 52).

Aspect 15: The apparatus of any one of aspects 1 to 10, wherein the second gas is a nebulizer gas (23) or an auxiliary gas (24) used in the ionization source.

Aspect 16: The apparatus of aspect 2 and 15, wherein the condition of the apparatus is classified as non-leaky if the MS signal of the analyte increases with increasing flow rates of the nebulizer gas or the auxiliary gas (43; 44).

Aspect 17: The apparatus of aspect 2 and 15 or aspect 2 and 16, wherein the condition of the apparatus is classified as leaky if the MS signal of the analyte is substantially independent on the flow rate of the nebulizer gas or the auxiliary gas (53; 54).

Aspect 18: The apparatus of any one of aspects 1 to 10, wherein the MS signal of the analyte has a first feature, optionally a single peak and/or a maximal value of the MS signal larger than a predetermined threshold value, in a predetermined mass-to-charge ratio (m/z) measurement range if the second gas flow is in a non-leaky state, and wherein analyzing the dependency of the MS signal of the analyte includes determining if the first feature is present, optionally wherein the second gas is a nebulizer gas (23).

Aspect 19: The apparatus of any one of aspects 1 to 10 or 18, wherein the MS signal of the analyte has a second feature, optionally two or more peaks and/or a maximal value of the MS signal smaller than a predetermined threshold value, in a predetermined mass-to-charge ratio (m/z) measurement range if the second gas flow is in a leaky state, and wherein analyzing the dependency of the MS signal of the analyte includes determining if the second feature is present, optionally wherein the second gas is a nebulizer gas (23).

Aspect 20: The apparatus of aspect 18 and 19, wherein the second feature is different from the first feature.

Aspect 21: The apparatus of any one of aspects 1 to 20, wherein the analyte comprises a dummy analyte.

Aspect 22: The apparatus of aspect 21, wherein the dummy analyte is selected to generate the MS signal exhibiting the dependency versus the parameter of the second gas flow or the state of the second gas flow.

Aspect 23: The apparatus of aspect 21 or 22, wherein the dummy analyte includes cesium iodide or wherein the dummy analyte is cyclosporine A.

Aspect 24: The apparatus of aspect 23, wherein the cesium iodide is $Cs_{n+1} I_n$ or $Cs_n I_{n+1}$, wherein n is a non-negative integer.

Aspect 25: The apparatus of any one of aspects 21 to 24, wherein the dummy analyte includes molecules with a molecular mass larger than 500 Da.

Aspect 26: The apparatus of any one of aspects 21 to 25, wherein the apparatus further comprises a dedicated flow-path for providing the dummy analyte to the ionization source.

Aspect 27: The apparatus of any one of aspects 21 to 26, wherein the apparatus further comprises a dedicated reservoir to provide the dummy analyte.

Aspect 28: The apparatus of any one of aspects 21 to 27, wherein the apparatus further comprises a dummy analyte pump (80) configured to pump the dummy analyte into the ionization source (20), optionally wherein the dummy analyte pump is fluidically connected to a valve-to-detector conduit (25') via a stream-selection valve (70), wherein the dummy analyte pump is configured to pump the dummy analyte through the valve-to-detector conduit (25') into the ionization source (20), further optionally wherein the dummy analyte pump (80) is a single piston pump connected to the ionization source (20).

Aspect 29: The apparatus of aspect 28, wherein the flow injection system includes a liquid chromatographic (LC) system, optionally wherein the LC system comprises a plurality of fluidic streams (32, 33, 34) alternately connectable to the ionization source (20) via the valve-to-detector conduit (25') through the stream-selection valve (70), further optionally wherein the LC system includes a capillary liquid chromatographic (CLC) device.

Aspect 30: The apparatus of aspect 29, wherein the analyte further comprises LC eluates flowing out of the LC system.

Aspect 31: The apparatus of any one of aspects 1 to 30, wherein the mass spectrometry (MS) apparatus (1) is configured to determine a condition of the apparatus based on the analyzed dependency upon predetermined trigger events or according to a predetermined schedule.

Aspect 32: The apparatus of aspect 31, wherein the measuring, analyzing, and determining steps are carried out automatically.

Aspect 33: A method in a mass spectrometry (MS) apparatus for chemical analysis, the method comprising:

providing (101) an ionized gas flow of an analyte towards an entrance of a mass spectrometer by an ionization source;

providing (101) a second gas flow of a second gas by the ionization source;

measuring (102) a mass spectrometer (MS) signal of the analyte by the mass spectrometer;

analyzing (103) a dependency of the MS signal of the analyte versus a parameter of the second gas flow or a state of the second gas flow;

determining (105) a condition of the apparatus based on the analyzed dependency.

Aspect 34: The method of aspect 33, wherein analyzing the dependency of the MS signal of the analyte includes comparing (104) the dependency of the MS signal of the analyte with a reference dependency.

Aspect 35: The method of aspect 33 or 34, wherein determining the condition of the apparatus includes classifying (106) the condition of the apparatus as being normal without a malfunction or abnormal having the malfunction, and/or determining that the apparatus is in an error condition.

Aspect 36: The method of any one of aspects 33 to 35, wherein the method further includes automatic triggering a response based on the determined condition.

Computer-Implementation

The controller of the present disclosure can be embodied in any suitable form (e.g., using any suitable hardware or software). In some examples, the controller can be a stand-alone computer device. In other examples, the controller can be integrated in a computer device or system, which also serves other purposes than carrying out the steps of the techniques of the present disclosure. The controller can be arranged locally or remotely connected (over a suitable network) to a site where the MS apparatus is located.

Further disclosed and proposed is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one, or even all of method steps as disclosed herein may be performed by using a computer or a computer network, typically by using a computer program.

Further disclosed and proposed is a computer program product having program code, in order to perform the method according to the present disclosure in one or more of the embodiments enclosed herein when the program is executed on a computer or computer network. Specifically, the program code may be stored on a computer-readable data carrier.

Further disclosed and proposed is a data carrier having a data structure stored thereon, which, after loading into a computer or computer network, such as into a working memory or main memory of the computer or computer network, may execute the method according to one or more of the embodiments disclosed herein.

Further disclosed and proposed is a computer program product with program code stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed is a modulated data signal, which contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing measurements.

Further disclosed and proposed is a computer, or computer network, comprising at least one processor, wherein the processor is adapted to perform the method according to one of the embodiments described in this description.

Further disclosed and proposed is a computer loadable data structure that is adapted to perform the method according to one of the embodiments described in this description while the data structure is being executed on a computer.

Further disclosed and proposed is a storage medium, wherein a data structure is stored on the storage medium and wherein the data structure is adapted to perform the method according to one of the embodiments described in this description after having been loaded into a main and/or working storage of a computer or of a computer network.

What is claimed is:

1. A mass spectrometry (MS) apparatus for chemical analysis, the apparatus comprising:
    a mass spectrometer;
    an ionization source coupled to the mass spectrometer;
    a flow injection system (FIS) coupled to the ionization source,
    wherein the ionization source is configured to provide an ionized gas flow of an analyte towards an entrance of the mass spectrometer,
    wherein the ionization source is further configured to provide a second gas flow of a second gas;
    wherein the apparatus is configured:
      to measure a mass spectrometer (MS) signal of the analyte;
      to analyze a dependency of the MS signal of the analyte versus a parameter of the second gas flow or a state of the second gas flow; and
      to determine a condition of the apparatus based on the analyzed dependency.

2. The apparatus of claim 1, wherein the parameter of the second gas flow is a flow rate of the second gas.

3. The apparatus of claim 1, wherein analyzing the dependency of the MS signal of the analyte includes comparing the dependency of the MS signal of the analyte with a reference dependency.

4. The apparatus of claim 1, wherein determining the condition of the apparatus includes classifying the condition of the apparatus as being normal without a malfunction or abnormal having the malfunction, and/or determining that the apparatus is in an error condition.

5. The apparatus of claim 4, wherein the malfunction or the error condition is a leakage of the second gas flow, and wherein the condition of the apparatus is a leakage condition of the apparatus.

6. The apparatus of claim 4, wherein the error condition is caused by gradual contamination or corrosion of the sprayer needle or capillary, or by gradual clogging or aging of other elements in the MS apparatus.

7. The apparatus of claim 1, wherein the ionization source further comprises a counter gas source configured to provide a counter gas flow of a counter gas outwards the entrance of the mass spectrometer, and wherein the second gas is the counter gas and the second gas flow is the counter gas flow.

8. The apparatus of claim 7, wherein the condition of the apparatus is classified as non-leaky if the MS signal of the analyte decreases with increasing flow rates of the counter gas.

9. The apparatus of claim 8, wherein the condition of the apparatus is classified as leaky if the MS signal of the analyte is substantially independent on the flow rate of the counter gas.

10. The apparatus of claim 1, wherein the second gas is a nebulizer gas or an auxiliary gas used in the ionization source.

11. The apparatus of claim 10, wherein the condition of the apparatus is classified as non-leaky if the MS signal of the analyte increases with increasing flow rates of the nebulizer gas or the auxiliary gas.

12. The apparatus of claim 11, wherein the condition of the apparatus is classified as leaky if the MS signal of the analyte is substantially independent on the flow rate of the nebulizer gas or the auxiliary gas.

13. The apparatus of claim 1, wherein the MS signal of the analyte has a first feature, and wherein analyzing the dependency of the MS signal of the analyte includes determining if the first feature is present.

14. The apparatus of claim 13, wherein the first feature is a single peak and/or a maximal value of the MS signal larger than a predetermined threshold value, in a predetermined mass-to-charge ratio (m/z) measurement range if the second gas flow is in a non-leaky state.

15. The apparatus of claim 14, wherein the second gas is a nebulizer gas.

16. The apparatus of claim 1, wherein the MS signal of the analyte has a second feature, and wherein analyzing the dependency of the MS signal of the analyte includes determining if the second feature is present.

17. The apparatus of claim 16, wherein the second feature is two or more peaks and/or a maximal value of the MS signal smaller than a predetermined threshold value, in a predetermined mass-to-charge ratio (m/z) measurement range if the second gas flow is in a leaky state.

18. The apparatus of claim 17, wherein the second gas is a nebulizer gas.

19. The apparatus of claim 1, wherein the analyte comprises a dummy analyte, wherein the dummy analyte is selected to generate the MS signal exhibiting the dependency versus the parameter of the second gas flow or the state of the second gas flow.

20. The apparatus of claim 19, wherein the dummy analyte includes molecules with a molecular mass larger than 500 Da.

21. The apparatus of claim 19, wherein the dummy analyte includes cyclosporine A or cesium iodide is Csn+1 In or CsnIn+1, wherein n is a non-negative integer.

22. The apparatus of claim 19, wherein the apparatus further comprises a dedicated flow-path for providing the dummy analyte to the ionization source.

23. The apparatus of claim 22, wherein the apparatus further comprises a dummy analyte pump configured to pump the dummy analyte into the ionization source.

24. The apparatus of claim 23, wherein the dummy analyte pump is fluidically connected to a valve-to-detector conduit via a stream-selection valve, wherein the dummy analyte pump is configured to pump the dummy analyte through the valve-to-detector conduit into the ionization source.

25. The apparatus of claim 24, wherein the dummy analyte pump is a single piston pump connected to the ionization source.

26. A method in a mass spectrometry (MS) apparatus for chemical analysis, the method comprising:
    providing an ionized gas flow of an analyte towards an entrance of a mass spectrometer by an ionization source;
    providing a second gas flow of a second gas by the ionization source;
    measuring a mass spectrometer (MS) signal of the analyte by the mass spectrometer;
    analyzing a dependency of the MS signal of the analyte versus a parameter of the second gas flow or a state of the second gas flow; and
    determining a condition of the apparatus based on the analyzed dependency.

* * * * *